(12) United States Patent
Gomes et al.

(10) Patent No.: US 10,309,313 B2
(45) Date of Patent: Jun. 4, 2019

(54) FUEL CIRCUIT OF AN AIRCRAFT ENGINE WITH A FUEL RECIRCULATING VALVE CONTROLLED BY A PRESSURE DIFFERENTIAL OF A LOW-PRESSURE PUMP OF THE FUEL SYSTEM

(71) Applicant: SAFRAN AIRCRAFT ENGINES, Paris (FR)

(72) Inventors: Nicolas Gomes, Moissy-Cramayel (FR); Lauranne Mottet, Moissy-Cramayel (FR); Antoine Veyrat-Masson, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 607 days.

(21) Appl. No.: 14/909,646

(22) PCT Filed: Jul. 31, 2014

(86) PCT No.: PCT/FR2014/052003
§ 371 (c)(1),
(2) Date: Feb. 2, 2016

(87) PCT Pub. No.: WO2015/015129
PCT Pub. Date: Feb. 5, 2015

(65) Prior Publication Data
US 2016/0177838 A1    Jun. 23, 2016

(30) Foreign Application Priority Data

Aug. 2, 2013  (FR) ...................................... 13 57734
Aug. 2, 2013  (FR) ...................................... 13 57736

(51) Int. Cl.
*F02C 7/22*      (2006.01)
*F02C 7/236*    (2006.01)
(Continued)

(52) U.S. Cl.
CPC .............. *F02C 7/236* (2013.01); *B64D 37/16* (2013.01); *B64D 37/28* (2013.01); *F02C 7/22* (2013.01);
(Continued)

(58) Field of Classification Search
CPC .. F02C 7/22; F02C 7/222; F02C 7/232; F02C 7/236; B64D 37/16; B64D 37/28
See application file for complete search history.

(56) References Cited

U.S. PATENT DOCUMENTS 3,095,707 A  *  7/1963  Flanigan .................. F02C 7/22
                                                         60/39.511
4,117,857 A  *  10/1978  Van De Mark ......... F02C 7/232
                                                         137/115.03
(Continued)

FOREIGN PATENT DOCUMENTS

DE    10 2004 055 575 A1    5/2006
EP         1 143 319 A1    10/2001
(Continued)

OTHER PUBLICATIONS

International Search Report dated Oct. 30, 2014 for PCT/FR2014/052003 filed on Jul. 31, 2014.

*Primary Examiner* — Steven M Sutherland
(74) *Attorney, Agent, or Firm* — Oblon, McClelland, Maier & Neustadt, L.L.P.

(57) ABSTRACT

A fuel circuit of an aircraft engine including a fuel tank; an engine fuel system including a low-pressure pump and a high-pressure pump, and a fuel recirculating pipeline connected to the engine fuel system; and a fuel recirculating valve arranged so as to switch between an open position and a closed position according to the pressure differential of the low-pressure pump, the valve being able to obstruct the fuel recirculating pipeline in the closed position, and to bring the fuel recirculating pipeline into communication with the fuel tank in the open position.

10 Claims, 5 Drawing Sheets

(51) Int. Cl.
 *F02C 7/232* (2006.01)
 *B64D 37/16* (2006.01)
 *B64D 37/28* (2006.01)

(52) U.S. Cl.
 CPC .............. *F02C 7/222* (2013.01); *F02C 7/232* (2013.01); *F05D 2220/323* (2013.01)

(56) References Cited

U.S. PATENT DOCUMENTS

| | | | |
|---|---|---|---|
| 4,899,535 | A | 2/1990 | Dehan et al. |
| 5,493,902 | A | 2/1996 | Glidewell et al. |
| 5,685,268 | A | 11/1997 | Wakemen |
| 7,007,452 | B1 | 3/2006 | Baryshnikov et al. |
| 2001/0022079 | A1 | 9/2001 | Blot-Carretero et al. |
| 2002/0184885 | A1 | 12/2002 | Blot-Carretero et al. |
| 2005/0279079 | A1* | 12/2005 | Baryshnikov ............ F02C 7/232 60/39.094 |
| 2007/0017206 | A1 | 1/2007 | Baryshnikov et al. |
| 2008/0260519 | A1* | 10/2008 | Dooley .................... F02C 7/232 415/118 |
| 2008/0264157 | A1 | 10/2008 | Degler et al. |
| 2012/0260658 | A1 | 10/2012 | Bader et al. |
| 2012/0261000 | A1* | 10/2012 | Futa ........................ F02C 7/232 137/101 |

FOREIGN PATENT DOCUMENTS

| | | |
|---|---|---|
| FR | 2 619 417 A1 | 2/1989 |
| FR | 2 950 863 A1 | 4/2011 |
| GB | 2 287 102 A | 9/1995 |

\* cited by examiner

FUEL CIRCUIT OF AN AIRCRAFT ENGINE WITH A FUEL RECIRCULATING VALVE CONTROLLED BY A PRESSURE DIFFERENTIAL OF A LOW-PRESSURE PUMP OF THE FUEL SYSTEM

GENERAL TECHNICAL FIELD

The invention concerns the general field of fuel circuit architectures of aircraft engines with motive flow tapping an engine fuel system.

PRIOR ART

Figure 1:
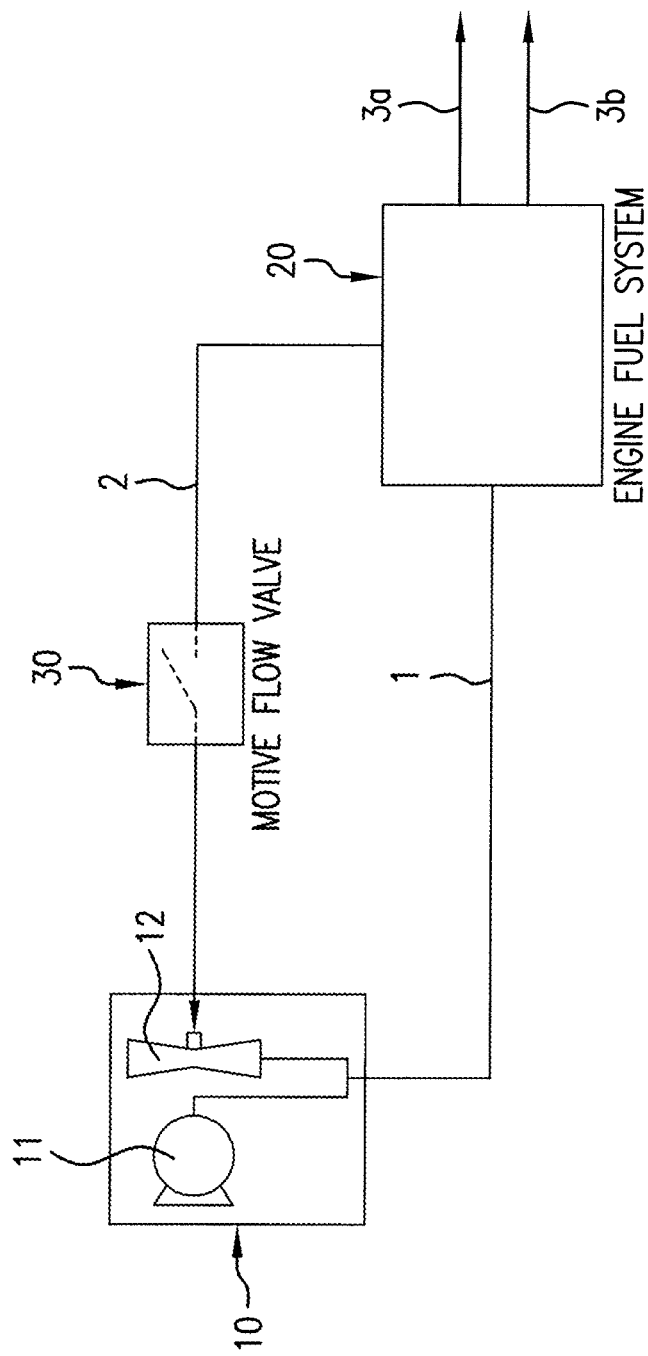

FIG. 1 illustrates a conventional fuel architecture of an aircraft engine. In such an architecture, an electrical pump 11, known as the aircraft pump, embedded in a fuel tank 10 sends fuel into an engine fuel system 20 of the aircraft by way of a supply line 1.

The engine fuel system 20 makes it possible to produce hydraulic energy and supply fuel to the engine of an aircraft (not depicted) and to the variable-geometry vanes (not depicted.)

This aircraft pump needs to be electrically powered.

To avoid systematically employing this aircraft pump, a jet pump 12 operating by Venturi effect is also embedded in the tank 10 and can take over from the aircraft pump under certain conditions.

This jet pump 12 needs a hydraulic power source which is, in a known manner, supplied by a fuel return line 2 tapping the engine fuel system 20.

This return line 2 makes it possible to send pressurized fuel taken from the engine fuel system 20 into the fuel tank 10.

It is however undesirable for the pressurized fuel to be sent arbitrarily to the tank 10 to power the jet pump 12.

To do this, a motive flow valve 30 can be positioned along the return line 2 in order to block it, under certain conditions dependent on the design and performances of the fuel system and in particular as a function of the rotation speed N2 of the aircraft engine.

From the document FR 2 619 417, a fuel circuit of an aircraft engine is already known comprising a fuel tank, an engine fuel system equipped with a low-pressure pump connected to the fuel tank and a high-pressure pump connected to the low-pressure pump. The fuel circuit further comprises a mixer device comprising on the one hand a mixing valve and on the other hand a return valve.

The mixing valve switches between an open position and a closed position, as a function of the pressure difference between a first and a second chamber, both supplied with a stream of hot fuel taken downstream of the high-pressure pump. The mixing valve further comprises a central chamber with a constant volume allowing a stream of cold fuel taken downstream of the low-pressure pump and a stream of hot fuel taken downstream of the high-pressure pump to mix together and be sent toward the fuel tank, when the mixing valve is in the open position.

The return valve switches between an open position and a closed position, as a function of the opening and closing of an electrovalve which, when open, makes it possible to inject a stream of fuel taken downstream of the high-pressure pump into a first chamber and to cause the draining of a second chamber so that the return valve opens, and when closed, cause fuel to leak from the first chamber toward the second chamber so that the valve closes, thus blocking the passage of a stream of warm fuel from the mixing valve toward the fuel tank.

In such a fuel circuit, the mixing valve and the return valve are therefore controlled as a function of the pressure of the stream of fuel downstream of the high-pressure pump.

Thus such a fuel circuit does not allow the device to be controlled as a function of the rotation speed of the engine.

There is therefore a need to control a motive flow valve under conditions of fuel system speed.

Moreover, the motive flow valve 30 must be closed when the engine is stopped and open at speeds greater than or equal to a predetermined speed.

However, it can happen that the valve exhibits a malfunction and remains jammed open so that it allows fuel to be sent from the engine fuel system 20 into the fuel tank 10 when this should not be the case. This impairs the engine performance since the operation of the fuel system is disturbed by the fuel stream taken in to be sent into the fuel tank.

There is thus also a need to detect a failure of such a motive flow valve 30.

PRESENTATION OF THE INVENTION

According to a first aspect the invention proposes a fuel circuit of an engine of an aircraft comprising:
a fuel tank;
an engine fuel system comprising:
  a low-pressure pump connected to the fuel tank, the low-pressure pump being capable of raising the pressure of a low-pressure stream of fuel from the fuel tank by a variable pressure difference;
  a high-pressure pump connected to the low-pressure pump capable of converting the low-pressure stream of fuel into a high-pressure stream of fuel;
a fuel return line connected to the engine fuel system, said line being capable of bringing the high-pressure stream into the fuel tank;
a motive flow valve arranged to switch between an open position and a closed position, as a function of the pressure difference of the low-pressure pump, said valve being capable of blocking the fuel return line in the closed position, and of putting the fuel return line in communication with the fuel tank, in the open position.

The invention is advantageously completed by the following features, taken alone or in any one of their technically possible combinations:
  the motive flow valve switches from the closed position to the open position as a function of a taring threshold of a spring of said valve;
  it comprises an actuating line connected, on one hand, upstream of the low-pressure pump and on the other hand, downstream of the low-pressure pump, the motive flow valve being disposed in said actuating line and is arranged to switch between the open and closed positions as a function of the pressure difference prevailing in said actuating line;
  the high-pressure pump is a positive displacement pump.

The invention also proposes an aircraft comprising an engine supplied with fuel by a fuel circuit according to the first aspect of the invention.

The actuating of the motive flow valve is passive, the opening and/or closing of the valve is commanded as a function of pressures (on either side of the low-pressure pump) of the fuel stream.

Thus it is no longer necessary to put in place a dedicated path for controlling the valve and where applicable a second dedicated path that would make it possible to acquire the speed N2 and which would increase the complexity and cost of the fuel circuit.

According to a second aspect the invention further proposes a fuel circuit of an aircraft engine, the fuel circuit including:
a fuel tank;
an engine fuel system connected to the fuel tank, said engine fuel system being capable of delivering a stream of fuel to the engine as a function of a speed of said engine;
a fuel return line connected between the engine fuel system and the fuel tank;
a motive flow valve arranged to switch between an open position and a closed position, said valve being capable of blocking, in the closed position, the fuel return line and of putting in communication, in the open position, the fuel return line with the fuel tank;
a computer configured to implement the following steps:
starting of the aircraft engine in such a way as to increase an engine speed from a zero speed to a minimum idle speed N0; and during the increase of said engine speed:
measuring, for several values of the engine speed Ni, of a corresponding temperature Ti of the stream of fuel from the fuel tank.

The invention is advantageously completed by the following features, taken alone or in any one of their technically possible combinations:
the minimum idle speed N0 is at least equal to 50% N2;
the computer is further configured to implement a step of determining a variation in the temperature of the stream of fuel for an engine speed Ni<35% N2 and if the determined variation is constant, a step of detecting a failure of the motive flow valve, the failure being a position locked open;
the computer is further configured to implement a step of determining a variation in the temperature of the stream of fuel for an engine speed Ni<35% N2 and if the determined variation is constant and if the evolution of the temperature between 35% N2 and 50% N2 has no inflexion point, a step of detecting a failure of the motive flow valve, the failure being locked in the open position;
the measuring of the temperature Ti of the stream of fuel from the fuel tank is carried out by means of a temperature sensor disposed along a line connecting the fuel tank to the engine fuel system.

The invention also proposes an aircraft comprising an engine supplied with fuel by a fuel circuit according to the second aspect of the invention.

Using the invention according to its second aspect, the detection of the failure of the motive flow valve does not require a dedicated position sensor to be put on the valve.

Specifically, the inventors have established that the temperature of the stream of fuel from the fuel tank is a parameter that is robust enough to the effect of opening the motive flow valve not to risk flagging up failures that do not exist.

The first aspect and the second aspect of the invention can advantageously be combined.

PRESENTATION OF THE FIGURES

Figure 2:
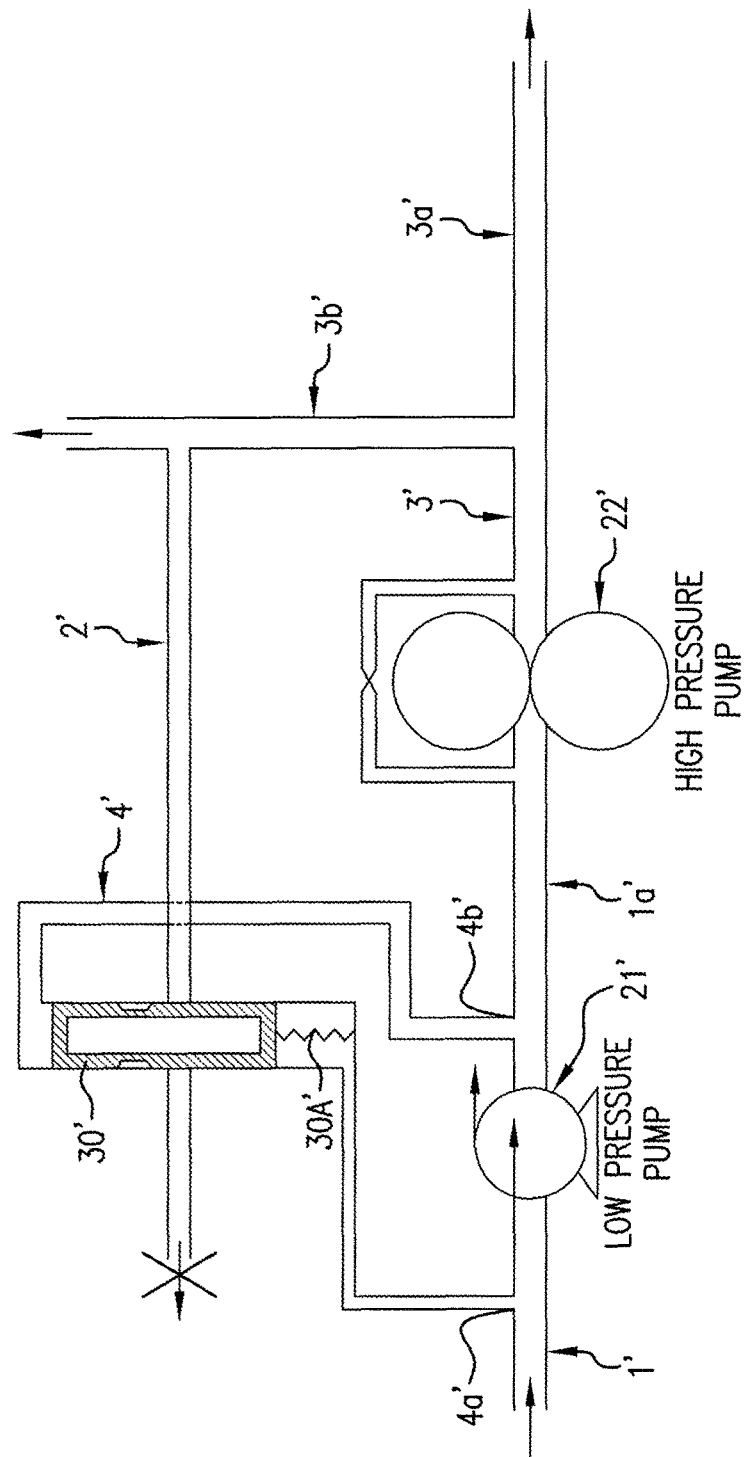
Figure 3:
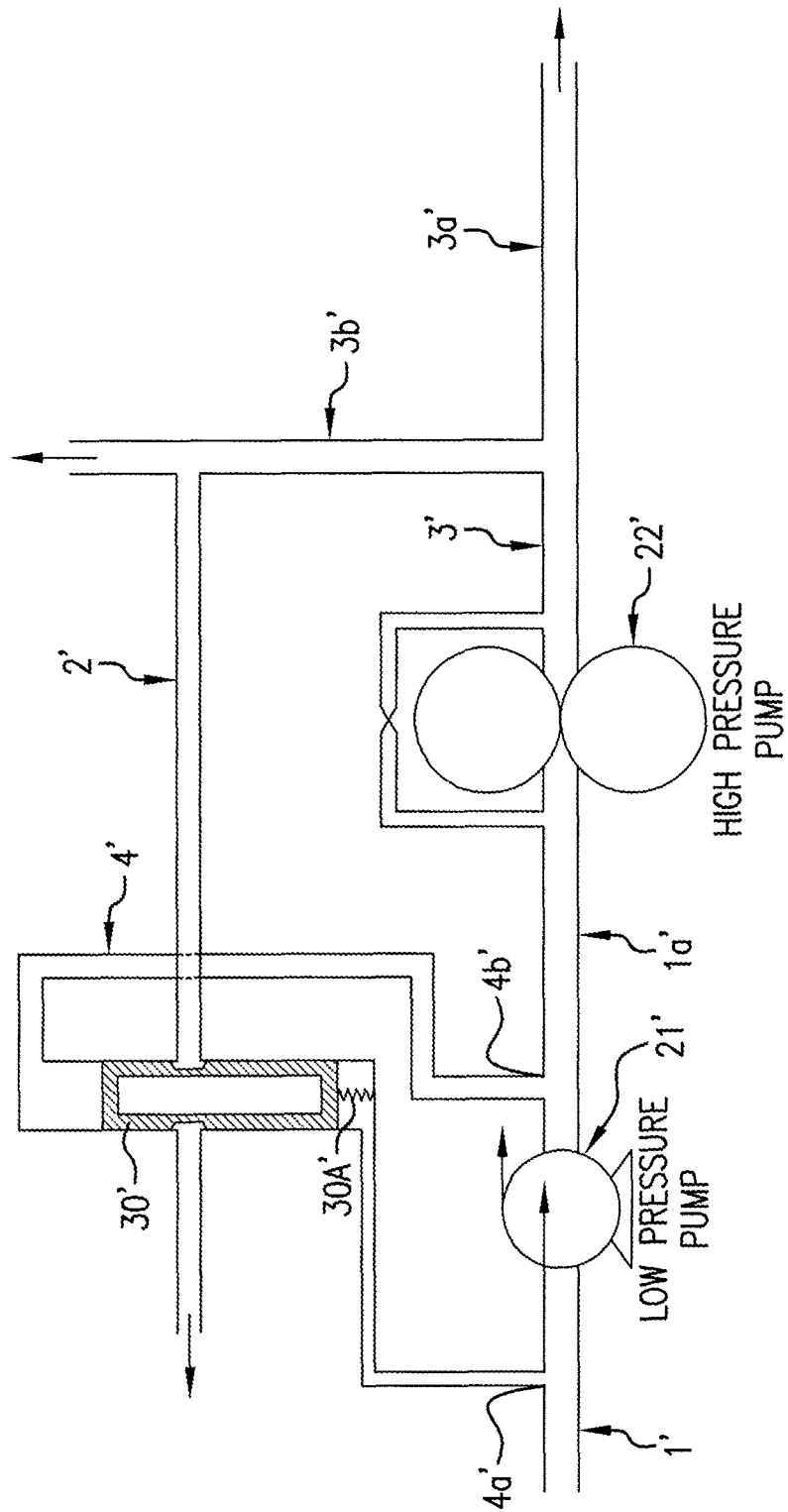
Figure 4:
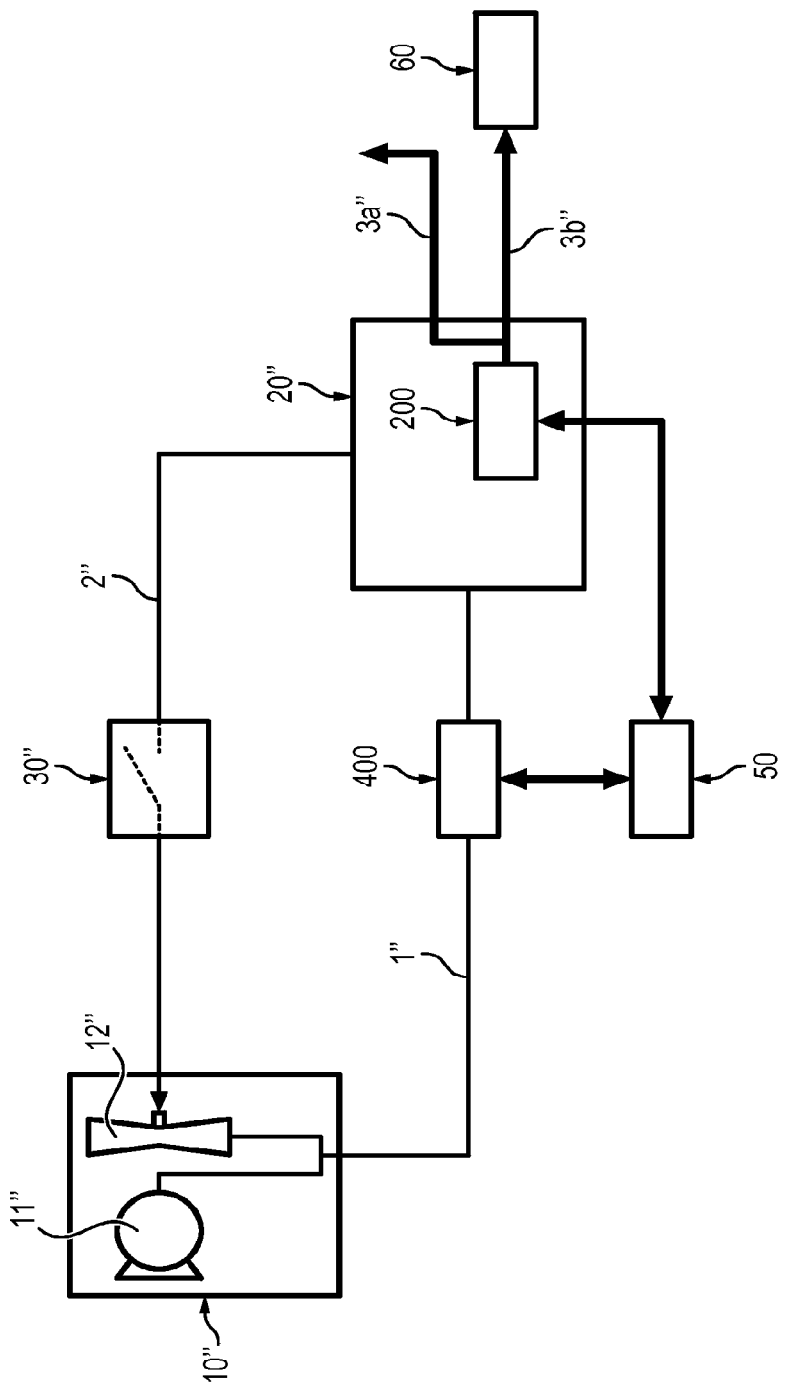
Figure 6:
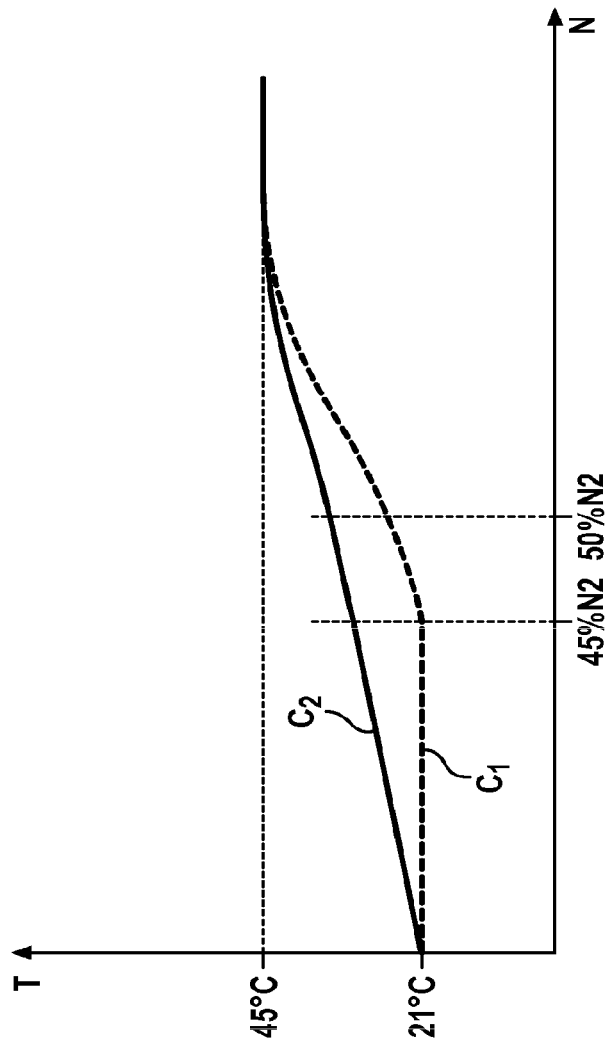
Figure 5:
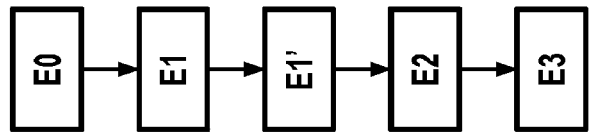

Other features, aims and advantages of the invention will become apparent from the following description, which is purely illustrative and non-limiting and which must be read with reference to the appended drawings wherein, FIG. 1 illustrates a conventional fuel architecture of an aircraft engine;
FIG. 2 illustrates an operation of a fuel circuit according to a first aspect of the invention in a closed position of a motive flow valve;
FIG. 3 illustrates an operation of a fuel circuit according to the first aspect of the invention in an open position of a motive flow valve;
FIG. 4 illustrates an architecture of a fuel circuit according to a second aspect of the invention;
FIG. 5 schematically illustrates the steps of a method according to the second aspect of the invention;
FIG. 6 illustrates an evolution of a temperature of a stream of fuel from a fuel tank according to the second aspect of the invention as a function of an engine speed supplied by the fuel circuit according to the invention.

In all the figures, similar elements bear identical reference numbers.

DETAILED DESCRIPTION OF THE INVENTION

FIGS. 2 and 3 illustrate an operation of the fuel circuit according to a first aspect of the invention in two positions of the motive flow valve.

The fuel system 20' comprises a low-pressure pump 21' capable of raising the pressure of the stream of fuel from the tank 10' by a variable pressure difference ΔP. The low-pressure pump 21' is connected to the fuel tank 10' by the supply line 1'.

The low-pressure pump 21' is followed directly downstream by a high-pressure pump 22' capable of raising the pressure of the stream of fuel from the low-pressure pump 21' in order to have a high-pressure stream of fuel at the outlet of this high-pressure pump. The high-pressure pump 22' is connected to the low-pressure pump 21' by way of a line 1a'. Advantageously, the high-pressure pump 22' is a positive displacement pump.

Note there that the term "low pressure" is understood to mean a pressure upstream of the high-pressure pump 22' and "high pressure" a pressure downstream of the high-pressure pump 22'.

The stream of fuel from the high-pressure pump is then directed on one hand toward the engine (not depicted) and on the other hand toward the variable-geometry vanes (not depicted) by way of the respective lines 3a', 3b'.

Of course, the fuel circuit includes other known components such as filters, heat exchangers, flow rate controllers etc. which do not need to be described here for the invention to be understood.

The fuel circuit also includes a motive flow valve 30' disposed on an actuating line 4' a first end of which 4a' is connected upstream of the low-pressure pump 21' and a second end of which 4b' is connected downstream of the low-pressure pump 21'.

The motive flow valve 30' is arranged to switch between a closed position (see FIG. 2) and an open position (see FIG. 3) as a function of the pressure difference prevailing between the first and second ends 4a', 4b' of the actuating line 4'.

In the open position, the valve 30' makes it possible to put the fuel return line 2' in communication with the fuel tank 10' in order for the high-pressure stream to be sent into the jet pump of the fuel tank 10'.

In the closed position, the valve 30' blocks the fuel return line.

The actuating of the valve 30' is advantageously implemented by means of a spring 30a' the taring threshold of which is dimensioned for a value of a set pressure difference $\Delta P = \Delta P0$.

Specifically, the applicant has shown that the pressure difference applied by the low-pressure pump 21' is variable and depends:
- on the rotation speed of the low-pressure pump 21' of the fuel system mechanically connected to the rotation speed N2 of the engine of the aircraft;
- of the flow rate of the stream of fuel at the engine inlet;
- on the manufacturing tolerances of the low-pressure pump;
- on the inlet temperature of the low-pressure pump.

Furthermore, the applicant has shown that the engine inlet flow rate, the manufacturing tolerances of the low-pressure pump, and the inlet temperature of the pump have an effect in the order of 2 in relation to the rotation speed of the pump on the pressure difference applied by the low-pressure pump such that this pressure difference is an indicator of the rotation speed N2 of the engine.

Specifically, it is not desirable for the motive flow valve 30' to send a high-pressure stream of fuel for certain rotation speeds N2 of the engine. These speeds can be defined by a range of aircraft engine rotation speeds N2, for example greater than 50% and strictly less than 50%.

As will be understood, the actuating of the motive flow valve 30' is a hydraulic and not an electrical device and therefore does not require any auxiliary provision to actuate it. It is a passive device.

In connection with FIG. 4, an architecture of a fuel circuit according to a second aspect of the invention comprises, besides the elements described in connection to FIG. 1, an "Engine Fuel Temperature" (EFT) sensor 400 disposed along the line 1" connecting the fuel tank 10" to the fuel system 20". Such a temperature sensor 400 makes it possible to make sure of the temperature of the stream of fuel sent into the fuel system 20". Furthermore, such a sensor is conventionally in connection with a device for generating an alarm (not depicted) to raise an alarm if conditions of temperatures at the engine inlet depart from the specified range (not described.)

It will be recalled that the fuel system 20" makes it possible to supply an engine 60 by way of the line 3b" and makes it possible to supply a hydraulic force to displace the various valves kinetically linked, on one hand to the variable-geometry vanes and on the other hand to the doors for evacuating the excess air downstream of the low-pressure compressor (not depicted) by way of the line 3a".

The fuel tank 10" comprises a stream of fuel at a first temperature and the fuel system 20" is adapted to deliver a stream of fuel as a function of a speed of said engine at a second temperature greater than the first temperature.

The fuel circuit in FIG. 4 further comprises a computer 50 which is configured to implement a method for detecting a failure of the motive flow valve 30" described below.

The method for detecting the motive flow valve 30" in accordance with the second aspect of the invention consists in observing the temperature of the stream of fuel at the inlet of the fuel system 20" at the start-up of the aircraft engine.

In connection with FIG. 5 a method for detecting a failure of the motive flow valve 30" comprises a step E0 of starting the engine aircraft during which the speed goes from a zero speed to a minimum idle speed N0 (around 50% of the maximum speed N2). During this starting phase, the method comprises a measurement E1 for several values of the engine speed Ni of the temperature Ti of the corresponding stream of fuel.

The measurement of the engine speed is, in this case, taken by means of a speed sensor 200 of the engine fuel system 20".

Thus, the method makes it possible to obtain a variation in the temperature T of the stream of fuel at the inlet of the fuel system 20" as a function of the engine speed N2.

Advantageously, the method comprises a step E2 of determination of a variation of the temperature of the stream of fuel for an engine speed of less than 35% N2.

If a constant increase in the temperature is observed, the method comprises a step E3 of detection of a failure of the motive flow valve 30", the failure being in the locked open position.

Alternatively, besides the constant variation of the temperature, the detection of the failure E3 is carried out if the evolution of the temperature does not comprise any inflexion point in the range of the engine speed 35% N2 and 50% N2. This allows more robust failure detection.

Specifically, the motive flow valve 30" is commanded to open for an engine speed between 35 and 50% of N2 when the engine starts and to be closed outside this range.

Thus, from the opening of the motive flow valve, a stream of fuel from the fuel system 20" to act as hydraulic energy for the jet pump 12" (see FIGS. 1 and 4) is sent into the fuel tank 10". At the outlet of the jet pump 12" and therefore at the outlet of the fuel tank 10" and at the inlet of the fuel system 20" there is a mixture between the stream of fuel present in the fuel tank 10" and the stream of fuel from the fuel system 20".

The stream of fuel at the outlet of the fuel tank 10" is therefore a mixture between a stream at the temperature of the fuel tank and a stream at a higher temperature, since it comes from the fuel system as it is heated inside the fuel system by way of a heat exchanger (not depicted) and the fuel pump (not depicted.) The result of this is that the stream of fuel sent to the inlet of the fuel system 20" sees its temperature increase upon opening of the motive flow valve 30".

Thus, in the situation where the motive flow valve 30" is operational and therefore closed before the opening range of 35-50% N2, one observes by way of the temperature sensor 400 a temperature of the stream of fuel that is constant at the inlet of the fuel system 20" until it reaches the speed range of opening of the motive flow valve 30" then as soon as the motive flow valve 30", is open, one observes an increase of the fuel temperature at the inlet of the fuel system 30". There is therefore an inflexion point of the temperature of the stream of fuel from the fuel tank, at the inlet of the fuel system, upon the opening of the motive flow valve 30".

If, on the contrary, the motive flow valve 30" is in a failure locked in the open position then the heating of the stream of fuel from the fuel tank 10" is effective from the beginning of the increase in speed and therefore before the speed range of opening of the motive flow valve 30" (i.e. for an engine speed N between 35% N2 and 50% N2). One therefore no longer observes the inflexion point of the temperature of the stream of fuel from the fuel tank, but a constant increase from the beginning. It is this phenomenon shown by the inventors that makes it possible to detect the failures of the motive flow valve.

FIG. 6 illustrates the evolution of the temperature T (in degrees Celsius) of the stream of fuel from the fuel tank as a function of the engine speed in terms of % N2 supposing here that the fuel valve opens for an engine speed from 45% N2 onwards.

As explained previously, at the nominal speed (curve C1) the evolution of the temperature is constant within the range for which the motive flow valve is closed (for an engine speed of less than 35% N2) and increases gradually within the range for which the motive flow valve is open (for an engine speed between 35 and 50% N2).

On the other hand, in a situation of a failure locked in the open position (curve C2) of the motive flow valve 30", the temperature increases constantly within the range for which the motive flow valve is closed (for an engine speed of less than 35% N2) and with no inflexion point within the range for which the motive flow valve is open (for an engine speed between 35 and 50% N2).

The first and second aspects of the invention can advantageously be combined. Thus, the method for detecting a failure of a motive flow valve according to the second aspect of the invention can be applied to a motive flow valve 30' according to the first aspect of the invention, and the engine fuel circuit according to the second aspect of the invention can comprise a motive flow valve 30' according to the first aspect of the invention.

The invention claimed is:

1. A fuel circuit of an engine of an aircraft comprising:
   a fuel tank;
   an engine fuel system comprising:
      a low-pressure pump connected to the fuel tank, the low-pressure pump being capable of raising a pressure of a low-pressure stream of fuel from the fuel tank by a pressure difference which is variable; and
      a high-pressure pump connected to the low-pressure pump, the high-pressure pump being capable of converting, the low-pressure stream of fuel into a high-pressure stream of fuel;
   a fuel return line connected to the engine fuel system, the fuel return line being capable of bringing the high-pressure stream into the fuel tank; and
   a motive flow valve arranged to switch between an open position and a closed position, as a function of the pressure difference of the low-pressure pump, the motive flow valve being capable of blocking the fuel return line in the closed position, and of putting the fuel return line in communication with the fuel tank, in the open position.

2. The fuel circuit of an aircraft engine according to claim 1, wherein the motive flow valve switches from the closed position to the open position as a function of a taring threshold of a spring of the motive flow valve.

3. The fuel circuit of an aircraft engine according to claim 1, comprising an actuating line connected, on one hand, upstream of the low-pressure pump and on the other hand, downstream of the low-pressure pump, the motive flow valve being disposed in said actuating line and is arranged to switch between the open and closed position as a function of the pressure difference prevailing in said actuating line.

4. The fuel circuit of an aircraft engine according to claim 1, wherein the high-pressure pump is a positive displacement pump.

5. The fuel circuit of an aircraft engine according to claim 1, further comprising a computer configured to implement the following steps:
   starting of the aircraft engine in such a way as to increase an engine speed Ni from a zero speed to a minimum idle speed N0; and
   during the increase of said engine speed, measuring, for several values of the engine speed Ni, of a corresponding temperature Ti of the low-pressure stream of fuel from the fuel tank.

6. The fuel circuit of an aircraft engine according to claim 5, wherein the minimum idle speed N0 of the aircraft engine is at least equal to 50% N2, wherein N2 is a maximum rotation speed of the aircraft engine.

7. The fuel circuit of an aircraft engine according to claim 5, wherein the computer is further configured to implement a step of determining a variation in a temperature of the low-pressure stream of fuel for an engine speed Ni<35% N2 and, if the variation is constant, a step of detecting a failure of the motive flow valve, the failure being that said motive flow valve is locked in the open position, wherein N2 is a maximum rotation speed of the aircraft engine.

8. The fuel circuit of an aircraft engine according to claim 5, wherein the computer is further configured to implement a step of determining a variation in a temperature of the low-pressure stream of fuel for an engine speed Ni<35% N2 and, if the variation is constant and if an evolution of the temperature between 35% N2 and 50% N2 has no inflexion point, a step of detecting a failure of the motive flow valve, the failure being that said motive flow valve is locked in the open position, wherein N2 is a maximum rotation speed of the aircraft engine.

9. The fuel circuit of an aircraft engine according to claim 8, wherein the measuring of the temperature Ti of the low-pressure stream of fuel from the fuel tank is carried out by means of a temperature sensor disposed along a line connecting the fuel tank to the engine fuel system.

10. An aircraft comprising an engine supplied with fuel by a fuel circuit according to claim 1.

* * * * *

UNITED STATES PATENT AND TRADEMARK OFFICE
CERTIFICATE OF CORRECTION

PATENT NO. : 10,309,313 B2
APPLICATION NO. : 14/909646
DATED : June 4, 2019
INVENTOR(S) : Nicolas Gomes et al.

Page 1 of 1

It is certified that error appears in the above-identified patent and that said Letters Patent is hereby corrected as shown below:

In the Claims

In Column 7, Line 35 approx., Claim 1 delete "converting," and insert --converting--, therefor.

Signed and Sealed this
Fifth Day of November, 2019

Andrei Iancu
*Director of the United States Patent and Trademark Office*